INVENTORS
WILLIAM P. LONG
KENNETH A. DEGHETTO
WILLIAM C. CHATMAN
BY
Richard H. Thomas
ATTORNEY 
United States Patent Office 3,368,578
Patented Feb. 13, 1968

3,368,578
INTEGRAL SEAL POT ARRANGEMENT
William P. Long and William C. Chatman, Chester Township, and Kenneth A. Deghetto, Livingston, N.J., assignors to Foster Wheeler Corporation, New York, N.Y., a corporation of New York
Filed Oct. 22, 1965, Ser. No. 501,541
5 Claims. (Cl. 137—251)

This invention relates to a seal pot arrangement for diverting a gas flow into one of two conduits, and has particular applicability in the diversion of a high temperature gas flow from a catalytic cracker or similar unit.

Catalytic crackers, coke drums and similar units generate carbon monoxide or other gases at high temperatures. These gases can be burned for the liberation of additional heat, and it is economical to recover this heat by firing the gas flow in a heat recovery furnace or combustor.

Conventionally, large alloy or internally insulated carbon steel lines transfer the gas from the source to the furnace, or alternatively, to a bypass stack where the gas is vented to atmosphere when the furnace is not operating.

Although valves have been used in such installations, for closing off either the bypass line or line to the furnace, it is apparent that whatever arrangement is used must be capable of completely shutting off the line to the furnace. The reason for this is that shutdown of the furnace is generally for maintenance, and the like, and the high temperature gas flow, usually above 1000° F., must be completely diverted from the furnace.

More conventional arrangements utilize seal pots, which are essentially vertical steel drums capable of being flooded with water to prevent the flow of gas. In addition to being safer, seal pots require a lower capital cost and less maintenance than valves.

Two seal pots are required, one for the bypass line and one for the line to the furnace. Thus, flue gas flows to the furnace when the seal pot for the bypass line is filled with water, and flows to the stack when the seal pot for the bypass line is drained and the furnace line seal pot is filled.

It is known to save in foundation costs by stacking the seal pots vertically, but since there remains two separate vessels, one on top of the other, high capital costs are still involved in piping and vessel materials. In addition, external expansion joints are required between the multiple connections to the vertically stacked members.

Disadvantages of conventional systems are overcome in accordance with the invention by providing in a single shell, an integral seal pot arrangement which comprises spaced apart upper and lower baffles within the shell separating the shell into a central inlet compartment and upper and lower exhaust compartments. A single supply conduit for the hot gas is connected to the shell adapted to admit the hot gas into the central inlet compartment. The upper and lower baffles each comprises a circular conduit defining a gas passageway leading away from the central inlet compartment, and a peripheral flange at one end of each conduit adapted to support the conduit axially in the shell. The flange free ends are welded continuously to the shell, with the baffles inverted relative to each other so that the lower baffle has its free end facing downwardly and the upper baffle has its free end facing upwardly.

A cylindrical gas-tight hood which includes a top and continuous side wall encompasses the upper baffle, with means supporting the hood in spaced relationship with the baffle to define an annular upper passageway for the flow of gas from the upper conduit passageway to the upper exhaust compartment. The lower baffle is supported with its free end facing downwardly but spaced from the bottom of the shell to define a lower passageway between the lower conduit passageway and the lower exhaust compartment. Means are provided for admitting water into both exhaust compartments to heights sufficient to seal the upper and lower passageways.

The upper and lower exhaust compartments are in communication with the system bypass line and furnace line respectively.

The invention and advantages thereof will become apparent on further consideration of the specification with reference to the accompanying drawings, in which FIGURE 1 is an elevation section view illustrating the invention;

Figure 1:
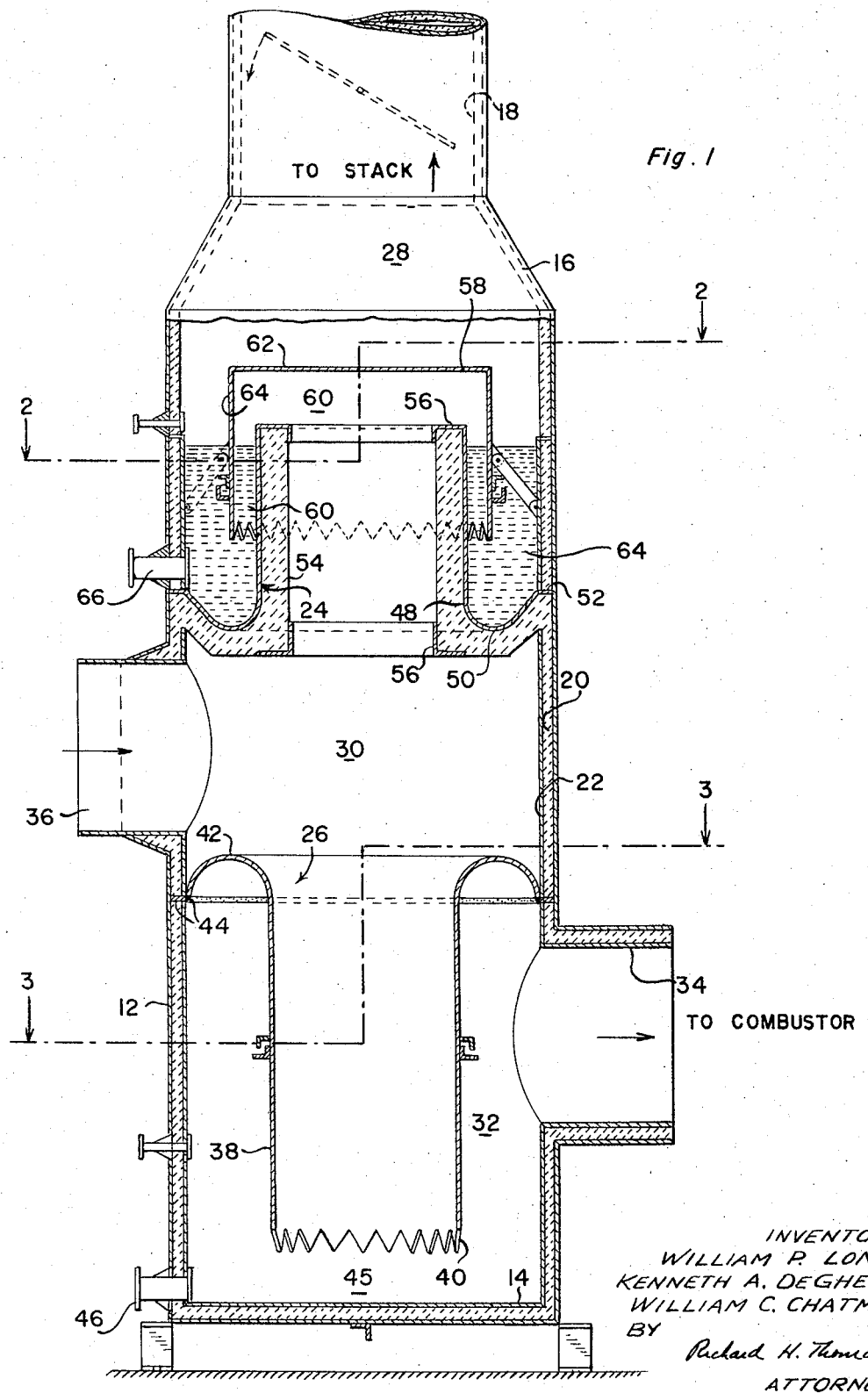
Figure 2:
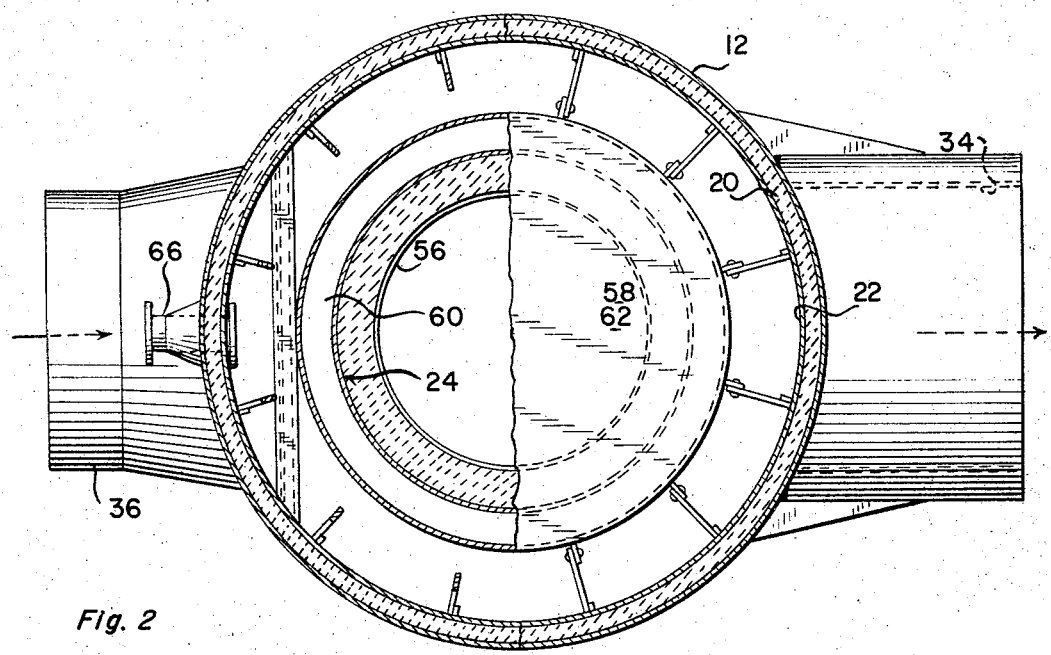
FIGURE 2 is a section view taken along line 2—2 of FIG. 1.
Figure 3:
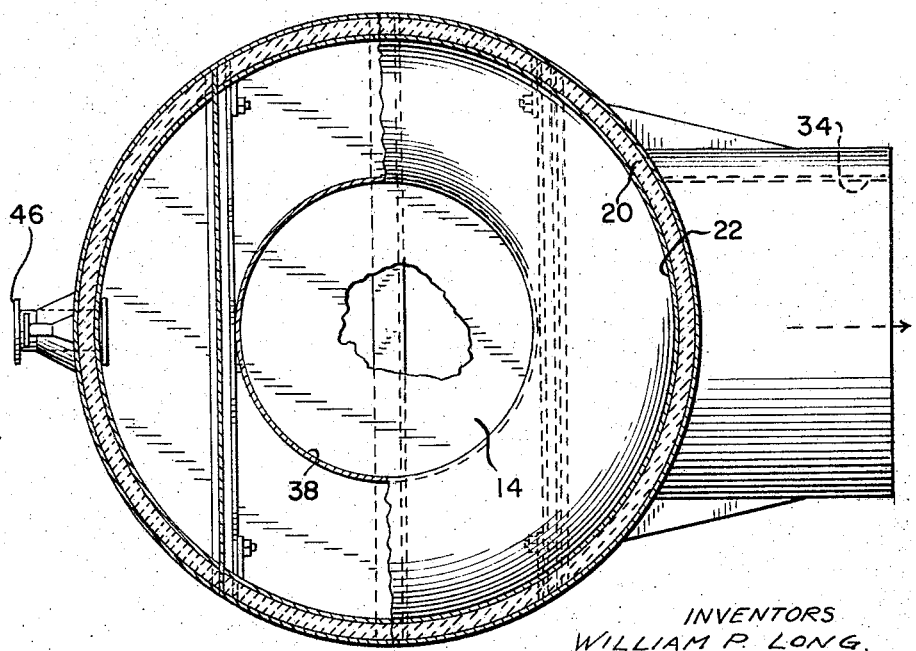
FIGURE 3 is a section view taken along line 3—3 of FIG. 1.

Referring to the drawings, the seal pot design utilizes a single cylindrical, vertically extending metal shell 12 having a bottom wall 14, and a top portion 16 with an upper exhaust opening 18 leading to a bypass stack (not shown). The shell is fully insulated with an insulation 20 and internally lined with a metallic liner 22 as shown. Generally, the liner is used in passages or chambers where the insulation would be subject to gas erosion. Upper and lower baffles 24 and 26 respectively divide the shell interior into an upper exhaust chamber 28, an intermediate inlet chamber 30 and a lower exhaust chamber 32. The upper and lower exhaust chambers 28 and 32 are in fluid communication with the bypass line exhaust opening 18 leading to the stack, and the exhaust opening 34 leading to a combustor (not shown). A single inlet opening 36 is provided leading from a suitable source of gas (not shown) to the intermediate inlet chamber 30.

The lower baffle comprises a single tubular section or conduit 38 having a serrated lower edge 40 and a continuous U-shaped or domed peripheral flange 42 at the upper end welded to the shell wall 12 by weld and extension 44 supporting the conduit 38. The conduit is also supported axially within the seal pot shell so that the serrated lower edge 40 is spaced from the shell bottom 14 to define passageway 45 between lower exhaust compartment 32 and the inside of conduit 38. Pipe 46 at the lower end of the exhaust compartment 32 admits and exhausts water from the compartment. To seal off the passageway 45, between the inlet compartment 30 and exhaust opening 34, the water level in the compartment is raised above the serrated edge 40 of the baffle conduit 38.

The upper baffle 24 comprises a metallic conduit 48 having a continuous U-shaped, lower, peripheral flange 50 welded by weld and extension 52 to the seal pot shell 12 at a point above inlet compartment 30. On the hot gas side of the conduit 48 and flange 50, a continuous layer of insulation 54 is provided to prevent boiling of water on the water side of the baffle 24 (between the baffle and shell). Angle 56 prevents erosion of the lower corner of the insulation. Above the free upper end 56 of the baffle 24, a hood 58 is axially supported spaced from the baffle to define a gas passageway 60 leading from the intermediate inlet chamber 30 to the upper exhaust chamber 28. The hood is provided with a top 62 and a side wall 64 which extends below the free end 56 of the baffle conduit to define an essentially gas-tight passageway.

To seal off this passageway 60, water is admitted into the annular chamber 64, surrounding the baffle 24 and between the baffle and shell wall, via inlet pipe 66. The lower edge of the hood is serrated, and the water level in chamber 64 is above this edge to seal the passageway.

It is apparent from the above that the integral seal pot design utilizes a single inlet line 36 in place of two inlet lines required when individual seal pots are stacked. Since the flow gas temperature is usually above 1000° F., and water for sealing must be introduced rapidly, large temperature gradients will occur. When the seal pots are stacked, these temperature gradients require expansion joints in both inlet lines in a conventional unit. The present invention avoids the use of such expansion joints.

In addition, the present invention allows the bypass stack to be supported directly on top of the shell pots thus saving an equivalent amount of stack height from grade. The saving in foundation costs when seal pots are disposed side-by-side is apparent.

The purpose of the half toroidal flange for the upper and lower baffles supporting the baffles in the shell, is to absorb movement of the baffles relative the shell.

In operation, flow to the combustor is achieved by draining the lower seal pot chamber 32 and filling the annulus 64 around the upper baffle 24. To achieve a flow to the stack, the reverse is undertaken, filling the lower chamber 32 and draining the upper annulus chamber.

As a further aspect of the invention, with respect to gas flow to the stack, the flow expands outwardly and downwardly around the hood 58. This reduces the velocity of the flow, so that it is unlikely that a slug of water will be carried into the stack, a problem confronted in previous designs.

Other advantages will be apparent to those skilled in the art. Although the invention has been described with respect to a single embodiment, various modifications within the spirit and scope of the invention will also be apparent to those skilled in the art.

What is claimed is:

1. An integral seal pot arrangement comprising
an elongated vertically extending cylindrical metal shell;
an exhaust opening at the top of the shell, the shell bottom being closed;
lower outlet means in the vicinity of the shell bottom;
support means at the bottom of the shell;
a single supply conduit connected to said shell about midway between the shell top and bottom adapted to admit hot gas to the inside of the shell;
upper and lower baffle means above and below said supply conduit and between the supply conduit and the exhaust opening and lower outlet means respectively, each of said baffle means comprising a circular tube, a peripheral flange at one end of the tube adapted to support the tube axially in the shell, the other end of the tube being free, the flanges supporting the tubes so that the lower baffle means tube free end faces downwardly spaced from the bottom of the shell to define a first passageway and the upper baffle means tube free end faces upwardly, the baffle means flanges being welded continuously in a gas tight manner to the shell;
a second inverted cup-shaped gas-tight hood above the upper baffle means, the lower free edge of the cup-shaped hood extending below the upper baffle means free end and defining with the upper baffle means a second passageway, the second passageway communicating with the exhaust opening, and the first passageway communicating with the lower outlet means; and
means for admitting water into said shell above the upper baffle means and below the lower baffle means to levels covering said baffle means tube free ends to seal said first and second passageways to flow of gas therethrough.

2. An integral seal pot arrangement comprising
an elongated vertically extending cylindrical insulated metal shell;
an exhaust opening at the top of said shell, the shell bottom being closed;
lower outlet means in the vicinity of the shell bottom;
support means at the bottom of the shell;
a single supply conduit connected to said shell about midway between the shell top and bottom adapted to admit hot gas to the inside of the shell;
upper and lower baffle means above and below said conduit;
each of said baffle means comprising a circular tube, a peripheral flange at one end of the tube adapted to support the tube axially in the shell, the other end of the tube being free;
the flange defining a continuous curved U-shaped cross-section with the flange end remote from the baffle means oriented approximately in the direction of orientation of the free end of the tube;
the flange remote ends being welded continuously in a gas-tight manner to said shell;
the lower baffle means free end facing downwardly but spaced from the shell bottom to define a first passageway and the upper baffle means free end facing upwardly;
a gas-tight hood including sides encompassing the upper baffle means free end, means supporting the hood in spaced relationship with the baffle means free end to define a second passageway therebetween for the flow of gas;
means to maintain a water level around said upper baffle means above the lowermost portion of said hood to seal said second passageway; and
means to maintain a water level around the lower baffle means above the free end thereof to seal said first passageway.

3. A seal pot according to claim 2 wherein the lower baffle means free end and hood sides free end are serrated.

4. A seal pot according to claim 2 wherein the insulation is on the inside of the metal shell and is continuous; including
an inner lining on the inside of said insulation in areas within the shell where the insulation is subject to erosion.

5. A seal pot according to claim 4 wherein the upper baffle means has a gas side and a water side between the baffle means and shell, further including insulation on the gas side of said upper baffle means to prevent boiling of water on the water side thereof.

References Cited

UNITED STATES PATENTS

| | | | |
|---|---|---|---|
| 2,856,951 | 10/1958 | Greenway et al. | 137—251 |
| 3,003,517 | 10/1961 | Blaskowski | 137—253 |
| 3,187,765 | 6/1965 | Frank et al. | 137—253 |

WILLIAM F. O'DEA, *Primary Examiner.*

D. H. LAMBERT, *Assistant Examiner.*